United States Patent
Hassbjer et al.

[11] Patent Number: 6,128,689
[45] Date of Patent: Oct. 3, 2000

[54] SYSTEM FOR EXCHANGING DATA THROUGH DATA MEMORY AREA OF COMMON MEMORY IN SYNCHRONOUS AND ASYNCHRONOUS MODES

[75] Inventors: Nicolas Hassbjer; Jörgen Johansson, both of Halmstad; Staffan Dahlström, Gullbrandstorp; Andreas Kroop, Halmstad, all of Sweden

[73] Assignee: HMS Fieldbus Systems AB, Halmstad, Sweden

[21] Appl. No.: 08/843,232

[22] Filed: Apr. 14, 1997

[51] Int. Cl.[7] .............................. G06F 13/00; G06F 13/28; G06F 12/14
[52] U.S. Cl. .......................... 710/131; 710/200; 710/240
[58] Field of Search .................................. 395/551, 299, 395/310; 710/131, 200, 240

[56] References Cited

U.S. PATENT DOCUMENTS

| | | | |
|---|---|---|---|
| 4,615,017 | 9/1986 | Finlay et al. | 395/551 |
| 4,639,861 | 1/1987 | Appiano et al. | 395/299 |
| 4,823,304 | 4/1989 | Frantz | 709/232 |
| 5,293,491 | 3/1994 | Leung et al. . | |
| 5,329,630 | 7/1994 | Baldwin . | |
| 5,339,395 | 8/1994 | Pickett et al. | 395/310 |
| 5,410,655 | 4/1995 | Greenfield et al. . | |
| 5,829,052 | 10/1998 | Pawlowski et al. | 711/147 |

FOREIGN PATENT DOCUMENTS

| | | |
|---|---|---|
| 0 592 213 | 4/1994 | European Pat. Off. . |
| 3-110658 | 5/1991 | Japan . |
| 3-154148 | 7/1991 | Japan . |
| 4-188242 | 7/1992 | Japan . |
| 4-238558 | 8/1992 | Japan . |
| 5-20279 | 1/1993 | Japan . |
| 5-6328 | 1/1993 | Japan . |
| WO 87/01841 | 3/1987 | WIPO . |

OTHER PUBLICATIONS

"Parallel and Distributed Computation," by Dimitri P. Bertsekas and John N. Tsitsiklis, Prentice Hall, 1989, pp. 88–91, 95–96.

"Mastering Windows NT Programming,"

*Primary Examiner*—Krisna Lim
*Attorney, Agent, or Firm*—Oblon, Spivak, McClelland, Maier & Neustadt, P.C.

[57] ABSTRACT

A device for use when exchanging data between two processor units comprises a first processor unit, which is arranged to selectively operate in one of a synchronous mode and an asynchronous mode when exchanging data with a second processor unit through a data memory area in a common memory. Preferably, the access to the data memory area is controlled by a state machine in the first processor unit. The state machine has a first state in which the data memory area is free, a second and a third state in which the data memory area is reserved for the first processor unit and the second processor unit, respectively, and a fourth and a fifth state, in which the data memory area is accessed by the first processor unit and the second processor unit, respectively. The device is advantageously used in a fieldbus system.

25 Claims, 3 Drawing Sheets

| Bit | Name |
|-----|------|
| 7 | CND |
| 6 | Not used |
| 5 | REQ/REL |
| 4 | LOCK |
| 3 | IN AREA |
| 2 | OUT AREA |
| 1 | FB AREA |
| 0 | CTRL AREA |

SYSTEM FOR EXCHANGING DATA THROUGH DATA MEMORY AREA OF COMMON MEMORY IN SYNCHRONOUS AND ASYNCHRONOUS MODES

FIELD OF THE INVENTION

The present invention relates to a device and a method for exchanging data between two processor units.

BACKGROUND TO THE INVENTION

Fieldbus systems are frequently used in the industry for the communication between different units in control systems, e.g. between master units and slave units, and for the communication between different control systems.

One problem with the field bus systems is that there are many different systems. The differences relate for instance to the bus structure, the real-time behaviour, the amount of data that can be transferred, the transmission media and the distribution of power on the bus. In order for a unit to be compatible to different fieldbus systems, it needs to be able to handle their different technical requirements. Such a unit which is to be compatible to different fieldbus systems is, of course, much more expensive to manufacture than a unit which is designed only for a specific fieldbus system.

In order to solve this problem, the applicant has developed a series of adaptation modules, which are to be connected between a slave unit and a fieldbus. Each adaptation module is designed for a different fieldbus and thus has a specific fieldbus interface. However, all adaptation modules have the same interface against the slave unit. Thus, a slave unit can be connected to many different fieldbuses through one single interface.

The interface between the adaptation module and the slave unit is realised by a dual-port memory, which is accessible by a processor unit in the adaptation module and by a processor unit in the slave unit. The access to the memory is controlled by means of a handshake register in the memory. As a default state, the memory is assigned to the adaptation module When the slave processor unit wants to access the memory, it writes a request for access in the handshake register. It then has to wait until the adaptation processor unit is free to process the request, which may take some time since the adaptation processor unit is often very busy communicating with the fieldbus. The adaptation processor unit grants the slave processor unit access to the memory by writing an acknowledgement in the handshake register. After the slave processor unit has accessed the memory, it releases it to the adaptation module by writing a release in the handshake register.

One drawback of this method for accessing the dual port memory is that the slave processor unit can be locked out by the adaptation processor unit, if the adaptation processor unit always accesses the memory before the slave processor unit requests access thereto. Another drawback is that the exchange of data is slow due to long and unpredictable access times. This means that the adaptation module cannot be used between a master unit and the fieldbus, where the requirements for a fast exchange of data are more severe.

Furthermore, in a fieldbus system the following kinds of data need usually be transferred between a master and a slave unit. Cyclic input and output data, which is time-critical; non-cyclic message and/or command data, which is not time-critical; as well as non-cyclic fieldbus control and status data. Yet another drawback of the above-mentioned method is that it does not support the transfer of non-cyclic data and messages.

The above-mentioned problems may also arise in other applications, where two processor units exchange data through a common memory.

SUMMARY OF THE INVENTION

Thus, one object of the present invention is to provide an improved device and method for exchanging data between two processor units through a common memory.

More particularly, the device comprises a first processor unit, which is arranged to selectively operate in one of a synchronous mode and an asynchronous mode when exchanging data with a second processor unit through a data memory area in a common memory.

This possibility of operating in two different modes is very advantageous and renders the exchange of data more effective. By selecting the synchronous mode, the first processor unit can prevent a lock-out and see to it that both processor units get access to the data memory area. Under some circumstances it is, however, more efficient not to synchronise the access to the data memory area. By enabling the first processor to operate in the asynchronous mode under these circumstances, the efficiency of the exchange of data can be optimised.

The processor unit may be implemented by hardware circuits or by a combination of hardware and software, preferably by a suitably programmed microprocessor.

The first processor unit may be located on either side of the common memory. Thus, in a fieldbus system, the processor unit may be a processor unit in a slave unit, in an adaptation module or in a master unit.

In the synchronous mode, the first processor unit is preferably arranged to ensure that after an access of one of the processor units to the data memory area, the other processor unit gets access to it before the former processor unit is able to get access to it the next time. Thus, the first processor unit can be arranged to ensure that when it has had access to the memory, the second processor unit gets access thereto before the first processor unit gets access thereto the next time. This can be done, for instance, by the first processor ending an access to the memory area in the synchronous mode by reserving the data memory area for the second processor unit so that the first processor unit is unable to get access to the data memory area until the second processor unit has accessed it. It may be advantageous for the first processor unit to do so, when it wants the second processor unit to read the data before they are updated the next time by the first processor unit.

The first processor can also be arranged to ensure that when the second processor unit has had access to the memory, the first processor gets access thereto before the second processor unit gets access thereto the next time. This can be done, for instance, by the first processor requesting access to the memory area in the synchronous mode by reserving the data memory area so that it will get access thereto before the second processor unit gets access thereto the next time. It may be advantageous for the first processor unit to do so, when it knows that it needs to read data from the second processor unit before carrying out a certain operation.

A combination of the two cases above is of course also possible.

The possibility that the first processor unit operates in either of the synchronous and the asynchronous modes preferably means that the first processor unit is arranged to end an access to the memory area in the synchronous mode or in the asynchronous mode, and/or that the first processor unit is arranged to request access to the memory area in the synchronous mode or in the asynchronous mode.

Preferably, the first processor unit ends its access to the memory area in the synchronous mode if, when having access to the memory area, it receives a request from the second processor unit to obtain access to the memory area before the first processor obtains access to it the next time (i.e. a request for access in the synchronous mode). In this way the second processor unit can also affect whether the data exchange should be carried out in the synchronous mode or in the asynchronous mode.

The first processor unit can end the access in the asynchronous mode by releasing the memory area to a free state, i.e. a state wherein the memory area is reserved for neither of the processor units. This is advantageous in that the memory area can be more quickly assigned to a processor unit which requests access thereto, because the other processor unit need not examine whether the memory area is free or not. These shorter access times mean that the device can be used as an adaptation module between a master unit and a fieldbus.

The first processor unit preferably comprises a state machine for controlling the access to the data memory area, said state machine having a first state in which the data memory area is free, a second and a third state in which the data memory area is reserved for the first processor unit and the second processor unit, respectively, and a fourth and a fifth state, in which the data memory area is accessed by the first processor unit and the second processor unit, respectively. The state machine facilitates the implementation of the access control. Only the first processor unit needs to keep track of the status of the data memory area. The second processor unit simply request and ends accesses thereto.

Preferably, the device further comprises a memory, which constitutes said common memory and which comprises said data memory area. The memory can have a control memory area, which preferably is realised as two handshake registers, one for each processor unit. The first processor unit is arranged to write control information to and read control information from the second processor unit in order to control the access to the data memory area. The control information may for instance be a bit pattern, in which one or more bits indicate a requested access, an ended access, synchronous mode and asynchronous mode.

The memory can be a commercially available dual-port memory or a memory which is specifically designed for this application.

In order to further increase the rate of data exchange, the memory can have a plurality of data memory areas, which are accessible by both processor units. In this way, both processor units can access different memory areas at the same time so that the exchange of data may be carried out in parallel.

The same control memory area may be used for controlling the exchange of data of all data memory areas by including an item in the control information which indicates to which data memory area the control information pertains.

Advantageously, the control memory area may also be utilised for the exchange of non-cyclic information with the second processor unit independently of the exchange of cyclic data via the data memory area(s). In this way, the exchange of non-cyclic information does not affect the capacity of exchanging cyclic data.

The second processor unit may also be included in the device according to the invention. It is preferably arranged to operate in the same manner as the first processor unit so that both processor units can operate selectively in the synchronous and the asynchronous modes.

The device and method according to the invention is particularly advantageous in a fieldbus system where one of the processor units is connected to a third processor unit through the fieldbus.

BRIEF DESCRIPTION OF THE DRAWINGS

The present invention will be more fully understood from the detailed description given hereinbelow of a preferred embodiment, and the accompanying drawings which are given by way of illustration only, and in which.

DESCRIPTION OF A PREFERRED EMBODIMENT OF THE INVENTION

In the following example, the invention is applied to a fieldbus system.

Figure 1:
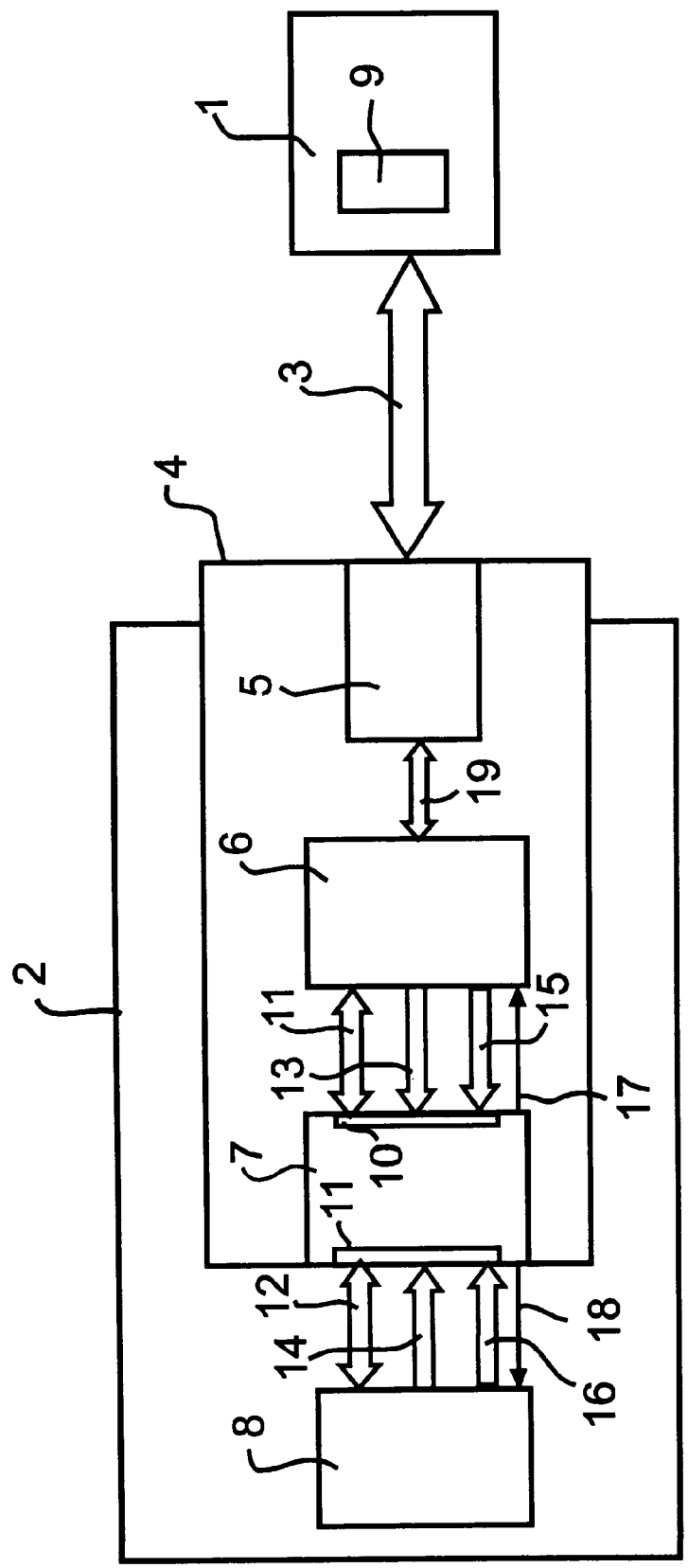
FIG. 1 is a schematic block diagram of an embodiment of the present invention applied to a fieldbus system.

FIG. 1 schematically shows a fieldbus system, comprising a master unit 1, which is connected to a slave unit 2 via a fieldbus 3 and an adaptation module 4. The fieldbus 3 is connected to the adaptation module 4 by means of a standard connector (not shown). The adaptation module is also connected to the slave unit by means of a standard connector (not shown). The adaptation module 4 comprises bus module 5, a first processor unit 6 and a dual-port memory 7. The slave unit 2 comprises a second processor unit 8, and the master unit 1 comprises a third processor unit 9. The bus module 5 constitutes the physical interface against the fieldbus. It provides for e.g. the adaptation of the signal levels to those used by the first processor unit 6. The memory 7 has two ports 10 and 11, one for the first processor unit 6 and one for the second processor unit 8. It can be a standard component, e.g. a DPRAM CY7C131 from Cypress Semiconductor Corporation, 3901 North First Street, San Jose, Calif. 95134, USA, or a component which has been specifically designed and manufactured for this application. The memory communicates with the first processor unit 6 and the second processor unit 8 via a data bus 11 and 12, respectively, an address bus, 13 and 14, respectively, a control bus 15 and 16, respectively as well as an interrupt line 17 and 18, respectively. The first processor unit 6 communicates via a serial bus 19 with the bus module 5.

The memory 7 has four data memory areas, which are accessible by both processor units 6 and 8 for read and write operations, as well as a control information area, which comprises two handshake register. The four data memory areas are intended for input process data (data from the master unit to the slave unit), output process data (data from the slave unit to the master unit), fieldbus specific data and message/command passing, as well as status data, respectively. The access to data memory areas is controlled with the aid of the handshake registers and a state machine for each one of the data memory areas. The state machines are implemented in software in the adaptation processor unit.

The transitions in the state machines are initiated by the processor units. Logic circuits are connected to the handshake registers for detecting when one processor unit writes control information in its handshake register and for generating an interrupt to the other processor unit when control information is detected. Such logic circuits are included in standard dual-port memories like the above-mentioned CYC7C131.

Figures 2, 3:
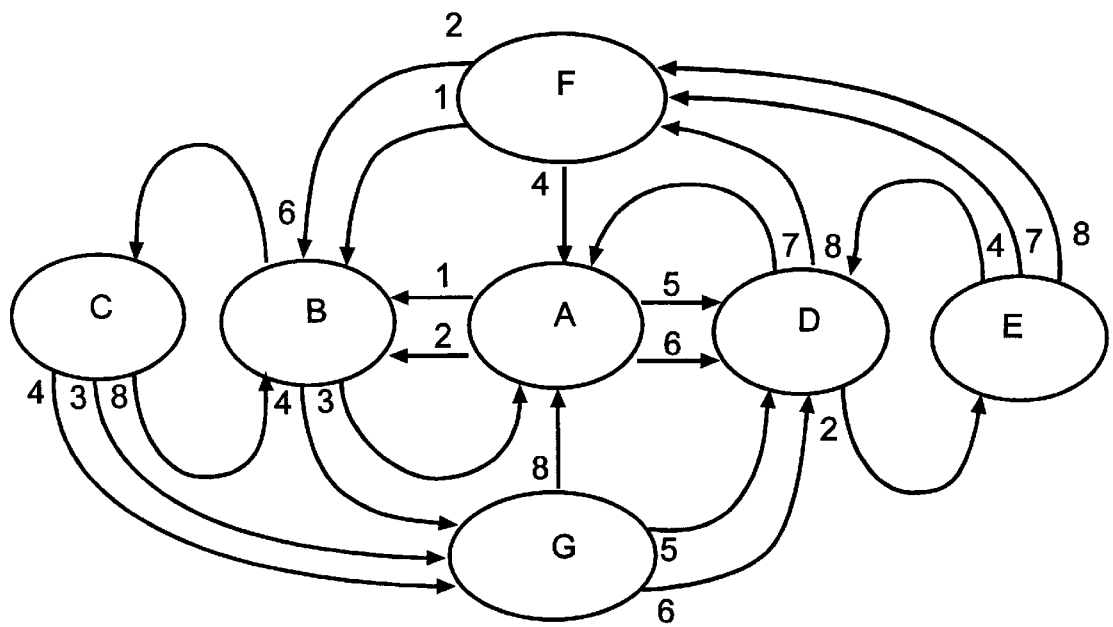
FIG. 2 is a state diagram, which is used for implementing one embodiment of the present invention.
FIG. 3 shows a bit pattern which is used in the embodiment of FIGS. 1 and 2.

FIG. 2 shows a state diagram of a state machine, which can be used for controlling the access to a data memory area in the dual port memory of FIG. 1. The state machine has the following eight states. A) The memory area is free, i.e. it is used neither by the adaptation module 4, nor by the slave unit 2. B) The memory area is used by the slave unit 2. C) The memory area is used by the slave unit 2 but reserved for the adaptation module 4 so that the slave unit 2 is unable to access the memory area until the adaptation module 4 has accessed it. D) The memory area is used by the adaptation module 4. E) The memory area is used by the adaptation module 4, but reserved for the slave unit 2 so that the adaptation module 4 is unable to access the memory area until the slave unit 2 has accessed it. F) The memory area is free, but reserved for the slave unit 2. G) The memory is free, but reserved for the adaptation module 4.

The state machine has the following transitions. 1) The slave unit 2 requests access to the memory area in the asynchronous mode. If the memory area is free, the slave unit will get access to it. 2) The slave unit 2 requests access to the memory area in the synchronous mode. If the memory area is free, the slave unit will get access to it. If it is not free, it will be reserved for the slave unit so that it will get access to it. 3) The slave unit 2 releases the memory area in the asynchronous mode, so that the memory area is free. 4) The slave unit 2 releases the memory area in the synchronous mode, so that it is reserved for the adaptation module. 5) The adaptation unit 4 requests access to the memory area in the asynchronous mode. 6) The adaptation unit 4 requests access to the memory area in the synchronous mode. 7) The adaptation unit 4 releases the memory area in the asynchronous mode. 8) The adaptation unit 4 releases the memory area in the synchronous mode.

The device shown in FIG. 1 operates as follows when the access to a memory area is controlled by a state machine in accordance with FIG. 2.

Assume that the memory area is free (state A). If the adaptation module 4 requests access to the memory area, either in the synchronous mode or in the asynchronous mode (transitions 5 and 6), it will get access thereto.

Now assume that the adaptation module 4 has written input process data in the memory area. These input process data are to be read by the slave unit, before it is meaningful to update the input process data in the memory area. Thus, the adaptation module ends the access to the memory area in the synchronous mode (transition 8) so that a transition occurs to state F. As soon as the slave unit 2 requests access to the memory area, it will get access thereto (transitions 1 and 2 to state B). Any request for access from the adaptation module 4 will be refused. If, however, the slave unit releases the memory area in the synchronous mode (transition 4) when it is reserved for the slave unit, the memory area becomes free (state A). This transition from state F to state A gives the slave unit 2 a possibility of freeing the memory area if, for instance, it detects an internal error or the need for further data or commands from the master unit 1 before it can access the memory.

Now assume instead that the adaptation module 4 has written the input process data in the memory area, but that the adaptation module wants to ensure that the input process data is always updated when the slave unit 2 reads them. Then the adaptation module releases the memory in the asynchronous mode (transition 7 to state A) so that the next access to the memory will be made by tat unit which first requests access thereto. In this way, the adaptation module 4 will be able to update the input process data, if it receives new input process data from the master unit 1 before the adaptation module reads the input process data.

If the adaptation module, during its access to the memory (i.e. in state D), receives from the slave unit, a request for an access to the memory in the synchronous mode (transition 2), it will go to state E, from which the memory will be released to state F when the adaptation module ends its access. If, however, the adaptation module 4 in state E receives a release in the synchronous mode from the slave unit 2, i.e. an indication that the next access should be carried out by the adaptation module, it returns to state D.

The slave unit 2 operates in the same way as the adaptation module 4.

It should be understood that the software in the processor units can include time-outs, which are used for detecting erroneous operation and which may cause other transitions than those disclosed in FIG. 2.

The slave unit requests and ends accesses to a memory area by writing bit patterns in its associated handshake register in the memory. The adaptation module acknowledges the requested and ended accesses by writing bit patterns in its handshake register. The same bit patterns are used by the slave unit and the adaptation module. The configuration of the bit patterns is shown in FIG. 3. When set, bit 7 (CMD) indicates that bits 6–0 are a command ID. When reset, bit 7 indicates that bit 6–0 should be interpreted as follows. Bit 6 is not used. Bit 5 (REQ/REL) indicates whether it is a request (0) or a release (1). Bit 4 (LOCK) indicates whether the asynchronous mode (0) or the synchronous mode (1) is used. Bit 3 (IN AREA) is a flag for the input process data area. Bit 2 (OUT AREA) is a flag for the output process data area. Bit 1 (FB AREA) is a flag for the fieldbus specific area and bit 0 (CTRL AREA) is a flag for the status data area.

Figure 4:
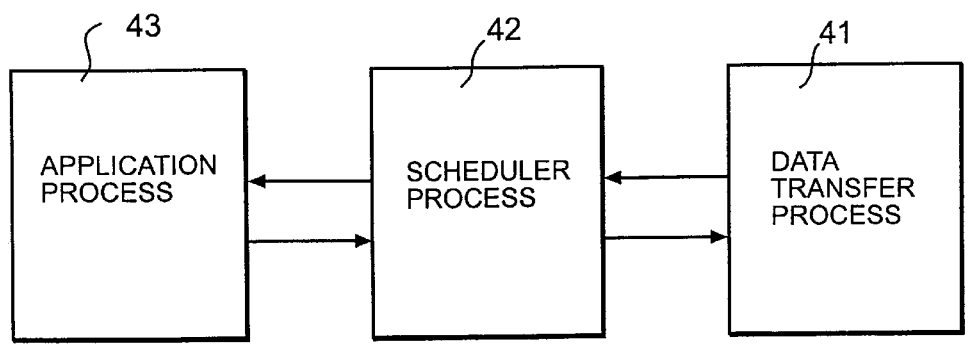
FIG. 4 shows an example of software processes which are used in the embodiment of FIGS. 1–3.

In this example, the software in the processor units 6 and 8 comprise three software processes for handling the access to the memory 7. These processes, which are schematically shown in FIG. 4, are a data transfer process 41 and a scheduler process 42 in the first processor unit 6 and an application process 43 in the second processor unit 8. The data transfer process 41 controls the first processor unit's 6 writing and reading of data in the memory 7. The application process 43 serves the same purpose for the slave unit 2. The scheduler process 42 includes the state machines and controls the access to the different memory areas.

Assume that the slave unit 2 wants to read the memory area for input process data if this area is free. The application process then requests access to that area by writing the following bit pattern (bits 7–0) in its handshake register (0,0,0,0,1,0,0,0) (request for access to input area in asynchronous mode). An interrupt is generated on the interrupt line 17 to the adaptation module 4. The scheduler process 42 processes the request. If the memory area is free, transition 1 from state A to state B in the state machine is effected. The scheduler process acknowledges the request by writing the same bit pattern in the handshake register of the adaptation module. If, however, the memory area is accessed by the adaptation module, it refuses the request by sending back the bit pattern with bit 3 reset to 0 the its handshake register. In such a case, no transition occurs in the state machine. All requests for access and ended accesses from the slave unit are handled correspondingly.

When the adaptation module wants to access a memory area or end an access to a memory area, the data transfer process calls the scheduler process in the same way as described above for the slave unit, using the same bit patterns. The only difference is that the scheduler process is called directly and not through a handshake register.

When the slave unit 2 or the adaptation module 4 wants to send a command or a message to the other unit, it writes a bit pattern with bit 7 set to 1 followed by a command ID of six bits in the handshake register. When the other processor unit reads the bit pattern, it interprets the last six bits as a command. This transfer of commands through the handshake register takes place independently of the transfer of data via the data memory areas. A command or a message may have associated data, e.g. parameters, which are transferred via the fieldbus data area.

Alternative Embodiments

Figure 5:
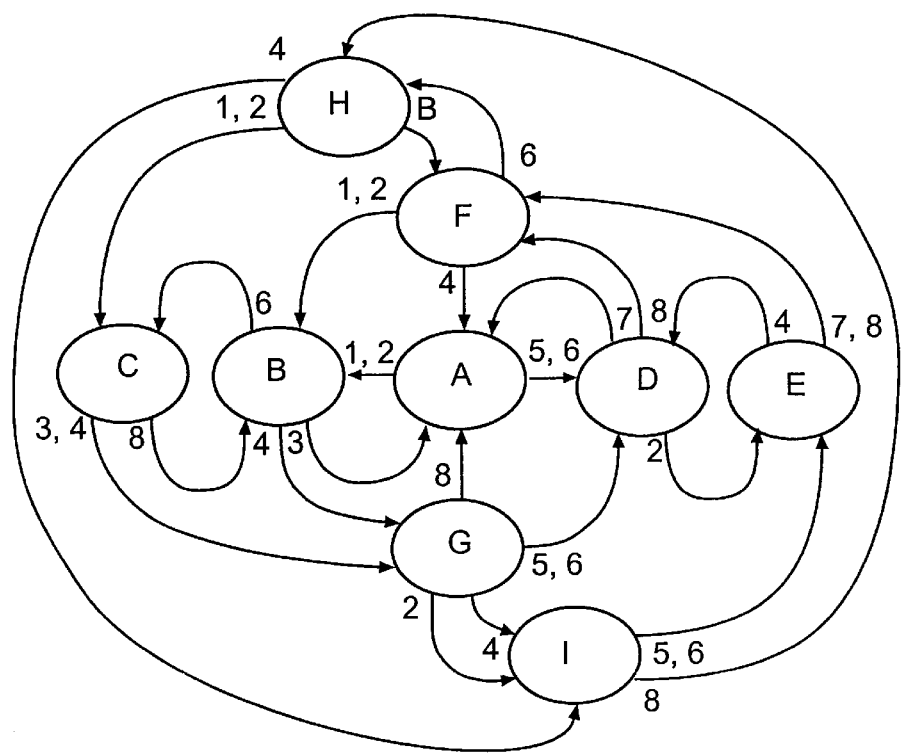
FIG. 5 is an alternative state diagram.

The state diagram of FIG. 2 can of course be expanded with further states. FIG. 5 discloses an example of such an expanded state diagram, in which states H and I have been added. In state H, the memory area is reserved for the slave unit and then for the adaptation module. In state I, the memory area is reserved for the adaptation module and then for the slave unit.

In the embodiment of FIGS. 1–4, the fieldbus system comprises one master unit and one slave units. In other embodiments, the fieldbus system may have more than one master unit and/or more than one slave unit.

What we claim and desire to secure by Letters Patent is:

1. A device for use when exchanging data between first and second processor units, comprising:
    an adaptation processor unit exchanging data with said first processing unit and with said second processor unit, said adaption processor being arranged to selectively operate in one of a synchronous mode and an asynchronous mode when exchanging data with the second processor unit through a data memory area in a common memory,
    wherein the synchronous mode is defined as a mode in which the adaptation processor unit is arranged to ensure that after an access of one processor unit of the adaption processing unit and the second processor unit to the data memory area, the other processor unit of the adaption processing unit and the second processor unit gets access to the data memory area before the one processor unit is able to get access to the data memory area again.

2. A device according to claim 1, wherein, in the asynchronous mode, the adaptation processor unit releases the data memory in such a way that a processor unit which first requests access to the data memory area will get access to the data memory area first.

3. A device according to claim 1, wherein the adaptation processor unit is arranged to end an access to the data memory area in one of the synchronous and asynchronous modes, wherein, in the synchronous mode, the adaptation processor unit reserves the data memory area for the second processor unit so that the adaptation processor unit is unable to get access to the data memory area until the second processor unit has accessed the data memory area.

4. A device according to claim 3, wherein the adaptation processor unit is arranged to end its access to the data memory area in the synchronous mode, if, when having access to the data memory area, the adaptation processor unit receives a request from the second processor unit to obtain access to the data memory area before the adaptation processor unit gets access to the data memory area again.

5. A device according to claim 1, wherein, in the asynchronous mode, the adaptation processor unit is arranged to end an access to the data memory area by releasing the data memory area to a free state.

6. A device according to claim 1, wherein the adaptation processor unit is arranged to request access to the data memory area in one of the synchronous mode and the asynchronous mode, wherein, in the synchronous mode, the adaptation processor unit reserves the data memory area so that the adaptation processor unit will get access to the data memory area before the second processor unit gets access to the data memory area again, and wherein, in the asynchronous mode, the adaptation processor unit requests to have access to the data memory area only if the data memory area is free.

7. A device according to claim 1, wherein the adaptation processor unit comprises a state machine for controlling the access to the data memory area, said state machine having a first state in which the data memory area is free, a second state and a third state in which the data memory area is reserved for the adaptation processor unit and the second processor unit, respectively, and a fourth state and a fifth state, in which the data memory area is accessed by the adaptation processor unit and the second processor unit, respectively.

8. A device according to claim 1, wherein the adaptation processor unit is arranged between the first and second processor units on a signal transmission path.

9. A device according to claim 1, wherein the adaptation processor unit is configured to receive data from a fieldbus and to transmit data to the common memory.

10. A device for use when exchanging data between first and second processor units, comprising:
    a common memory including a data memory area and a control memory area;
    an adaptation processor unit exchanging data with said first and second processor units, said adaption processor unit being arranged to selectively operate in one of a synchronous mode and an asynchronous mode when exchanging data with the second processor unit through the data memory area,
    wherein the synchronous mode is defined as a mode in which the adaptation processor unit is arranged to ensure that after an access of one processor unit of the adaption processing unit and the second processor unit to the data memory area, the other processor unit of the adaption processing unit and the second processor unit gets access to the data memory area before the one processor unit is able to get access to the data memory area again, and
    wherein the adaption processor unit is arranged to write control information to and read control information from the second processor unit in order to control the access to the data memory area.

11. A device according to claim 10, wherein the adaptation processor unit is arranged to exchange cyclic data with the second processor unit via said at least one data memory area and to exchange non-cyclic information with the second processor unit via the control memory area independently of the exchange of cyclic data.

12. A device according to claim 10, wherein the common memory has a plurality of data memory areas, which are accessible by the adaptation and second processor units and wherein the control information comprises one item for indicating which data memory area the control information pertains to.

13. A device according to claim 10, wherein the adaptation processor unit is arranged to be connected to a fieldbus, and that the common memory further includes at least one data memory area for input data from the fieldbus, one data memory area for output data to the fieldbus, and one data memory area for fieldbus specific data.

14. A device for use when exchanging data with an external first processor unit, comprising:

a common memory including a data memory area;

an internal second processor unit; and an adaption processor unit exchanging data with said external first processor unit and said internal second processor unit, wherein each one of the first and second processor units is arranged to selectively and independently operate in one of a synchronous mode and an asynchronous mode when exchanging data through a data memory area in a common memory, wherein a processor unit which operates in its synchronous mode is arranged to ensure that after an access of one processor unit of the adaption processor unit and the second processor unit to the data memory area, the other processor unit of the adaption processor unit and the second processor unit gets access to the data memory area before the one processor unit is able to get access to the data memory area again.

15. A device according to claim 14, wherein the second processor unit is arranged to request access to the data memory area in one of the synchronous mode and the asynchronous mode, wherein, in the synchronous mode, the second processor unit reserves the data memory area so that the second processor unit will get access to the data memory area before the first processor unit gets access to the data memory area again, and wherein, in the asynchronous mode, the second processor unit requests to have access to the data memory area if the data memory area is free.

16. A device according to claim 14, wherein the second processor unit is arranged to end an access to the data memory area in one of the synchronous and asynchronous modes, wherein, in the synchronous mode, the second processor unit reserves the data memory area of the first processor unit so that the second processor unit is unable to get access to the data memory area until the first processor has accessed the data memory area and wherein, in the asynchronous mode, the second processor unit releases the data memory area in such a way that a processor unit which first request access to the data memory area will get access to the data memory area.

17. A device according to claim 14, wherein the second processor unit is arranged to end its access to the data memory area in the synchronous mode, if, when having access to the data memory area, the second processor unit receives a request from the first processor unit for an access to the data memory area before the second processor unit gets access to the data memory area.

18. A method for exchanging data between a first processor unit and a second processor unit through a data memory area in a common memory, comprising:

exchanging data, using the data memory area, selectively in one of a synchronous mode and an asynchronous mode, between the first and second processor units, wherein, in the synchronous mode, the first and second processor units ensure that after an access of one processor unit of the first and second processor units to the data memory area, the other processor unit gets access to the data memory area before the one processor unit is able to get access to the data memory area again, and wherein, in the asynchronous mode, the first and second processor units access the data memory area in a first-come, first-serve order when the data memory is free.

19. A method according to claim 18, wherein the first and second processor units exchange cyclic data through the data memory area and non-cyclic messages through a register in the common memory, the exchange of data and messages being carried out independently of each other.

20. A method according to claim 18, wherein the first and second processor units select one of the synchronous mode and the asynchronous mode when requesting access to the data memory area.

21. A method according to claim 18, wherein the first and second processor units control the selection of the synchronous mode and the asynchronous mode by exchanging control information via the common memory.

22. A method according to claim 18, wherein the first and second processor units separately control the access to each one of a plurality of data memory areas in the memory by exchanging control information via the memory.

23. A method according to claim 18, wherein the first and second processor units select one of the synchronous mode and the asynchronous mode when ending an access to the data memory area.

24. A method according to claim 23, wherein the first and second processor units release the data memory area to a free state when ending an access to the data memory area in the asynchronous mode.

25. A device according to claim 1, wherein the adaption processor unit is configured to be connected to a fieldbus.

* * * * *